United States Patent
Römer

(10) Patent No.: US 11,273,729 B2
(45) Date of Patent: Mar. 15, 2022

(54) VARIABLE EFFICIENCY ACTUATOR FOR A VEHICLE SEAT

(71) Applicant: Faurecia Automotive Seating, LLC, Auburn Hills, MI (US)

(72) Inventor: Bernd Römer, Stadthagen (DE)

(73) Assignee: Faurecia Automotive Seating, LLC, Auburn Hills, MI (US)

(*) Notice: Subject to any disclaimer, the term of this patent is extended or adjusted under 35 U.S.C. 154(b) by 474 days.

(21) Appl. No.: 16/021,132

(22) Filed: Jun. 28, 2018

(65) Prior Publication Data
US 2020/0001743 A1    Jan. 2, 2020

(51) Int. Cl.
*B60N 2/02*    (2006.01)
*B60N 2/22*    (2006.01)

(52) U.S. Cl.
CPC ......... *B60N 2/0232* (2013.01); *B60N 2/0244* (2013.01); *B60N 2/2213* (2013.01); *B60N 2/0276* (2013.01); *B60N 2002/0236* (2013.01); *B60N 2002/0268* (2013.01)

(58) Field of Classification Search
CPC .. B60N 2/0232; B60N 2/0244; B60N 2/2213; B60N 2/0276; B60N 2002/0236; B60N 2002/0268
USPC .......................................................... 116/284
See application file for complete search history.

(56) References Cited

U.S. PATENT DOCUMENTS

| | | | |
|---|---|---|---|
| 7,194,926 B2 | 3/2007 | Sakamoto | |
| 7,764,427 B2 | 7/2010 | Schuster | |
| 9,638,311 B2 | 5/2017 | Fukuda | |
| 2012/0319445 A1 | 12/2012 | Zolno | |
| 2015/0136938 A1* | 5/2015 | Kondo | B60N 2/502 248/573 |
| 2016/0280094 A1* | 9/2016 | Frye | B60N 2/0228 |
| 2018/0019689 A1 | 1/2018 | Seki | |

FOREIGN PATENT DOCUMENTS

| | | |
|---|---|---|
| DE | 102015110131 A1 | 12/2015 |
| JP | 2010025157 A * | 2/2010 |
| JP | 5716413 B2 | 8/2012 |
| JP | 2012154380 A | 8/2012 |
| WO | 2018161016 A1 | 9/2018 |

OTHER PUBLICATIONS

"Morohashi Akinori, Gear type transmission (English), ip.com" (Year: 2010).*
German Search Report for German App. No. DE 10 2019 114 993.2 dated Jan. 13, 2020, 4425 DE ∥, 12 pages.

* cited by examiner

*Primary Examiner* — James M McPherson
*Assistant Examiner* — Kyle J Kingsland
(74) *Attorney, Agent, or Firm* — Barnes & Thornburg LLP

(57) ABSTRACT

An actuation system for a vehicle seat includes a housing and a gear system located in the housing having one or more gears coupled together. The gears of the actuation system have a low actuation efficiency such that the gears move in response to a first input. The actuation system further includes an efficiency switch that may be activated so that the actuation system has a higher actuation efficiency.

19 Claims, 4 Drawing Sheets

VARIABLE EFFICIENCY ACTUATOR FOR A VEHICLE SEAT

BACKGROUND

Figure 1:
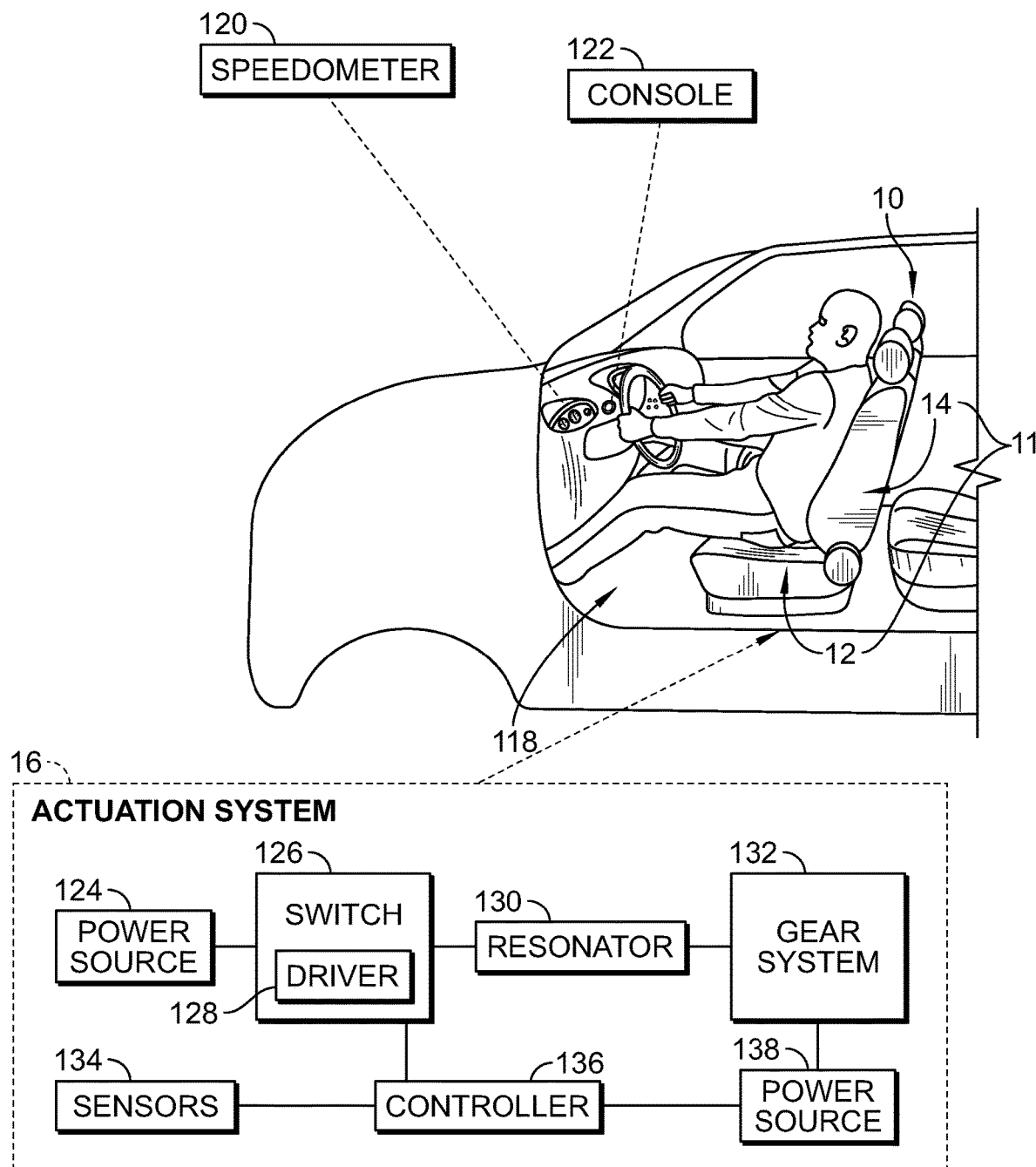

The present disclosure relates to an actuator, and particularly to an actuator for use with a vehicle component. More particularly, the present disclosure relates to an actuator including gear elements.

SUMMARY

According to the present disclosure an actuation system for a vehicle seat includes a housing and a gear system located in the housing having one or more gears coupled together. As a result, the one or more gears have a low actuation efficiency such that the gears move in response to a first input.

In illustrative embodiments, the actuation system further includes an efficiency switch coupled to the housing and configured to be switched from an inactive state in which the gear system has the low actuation efficiency to an active state in which the gear system has a relatively higher actuation efficiency. The gears move in response to a second input when the gear system has the higher actuation efficiency. The efficiency switch includes a driver configured to apply sound vibrations to the gears to cause friction between the gears to be minimized when the efficiency switch is in the active state.

In illustrative embodiments, the system includes a second housing and a second gear system located in the second housing and the efficiency switch is coupled to both the gear system and the second gear system to cause both gear systems to have the relatively higher actuation efficiency when the efficiency switch is in the active state. The gear systems are configured to rearrange the position of the seat bottom and the seat back.

In illustrative embodiments, the system includes vibration insulation configured to isolate the gear systems and efficiency switch from noise vibrations generated by the vehicle.

In illustrative embodiments, the driver is a piezo-driver and the efficiency switch further includes a resonator arranged to extend between and interconnect the gears, and the piezo-driver to transmit the sound vibrations from the driver to the gears.

In illustrative embodiments, the transmitted sound vibrations are configured to elicit microscopic oscillation of elements of the one or more gears. When the efficiency switch is in the active state, friction between the gears is lower compared to when the efficiency switch is in the inactive state.

In illustrative embodiments, the system further includes a powered driver configured to power the gears to change the seat position. The gears may change the seat position relatively faster and with reduced power from the powered driver relative to a speed and power required to change the seat position when the efficiency switch is in the inactive state when the efficiency switch is in the active state. In some embodiments, the first input is a force and the second input is relatively smaller force.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
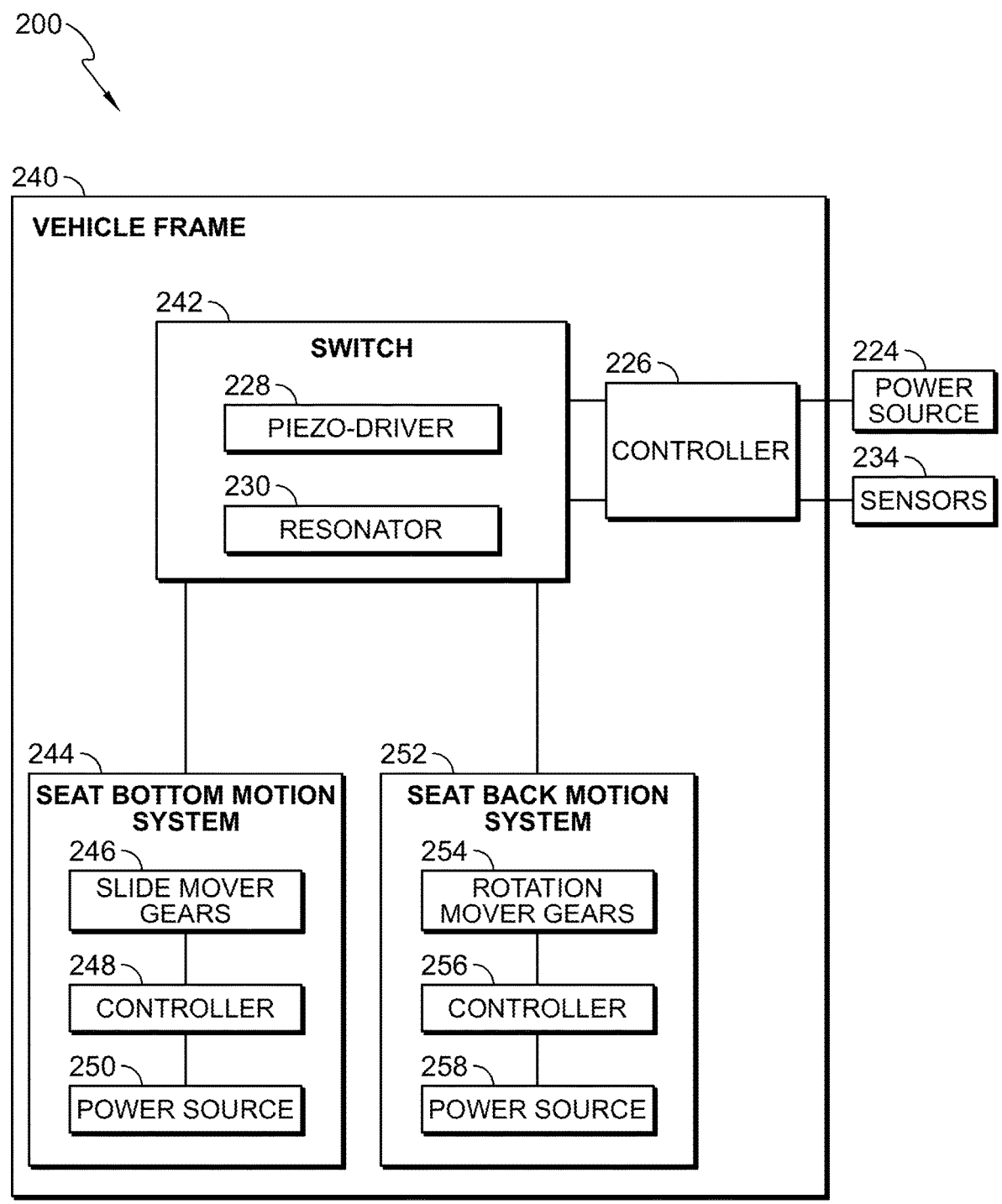
Figure 3:
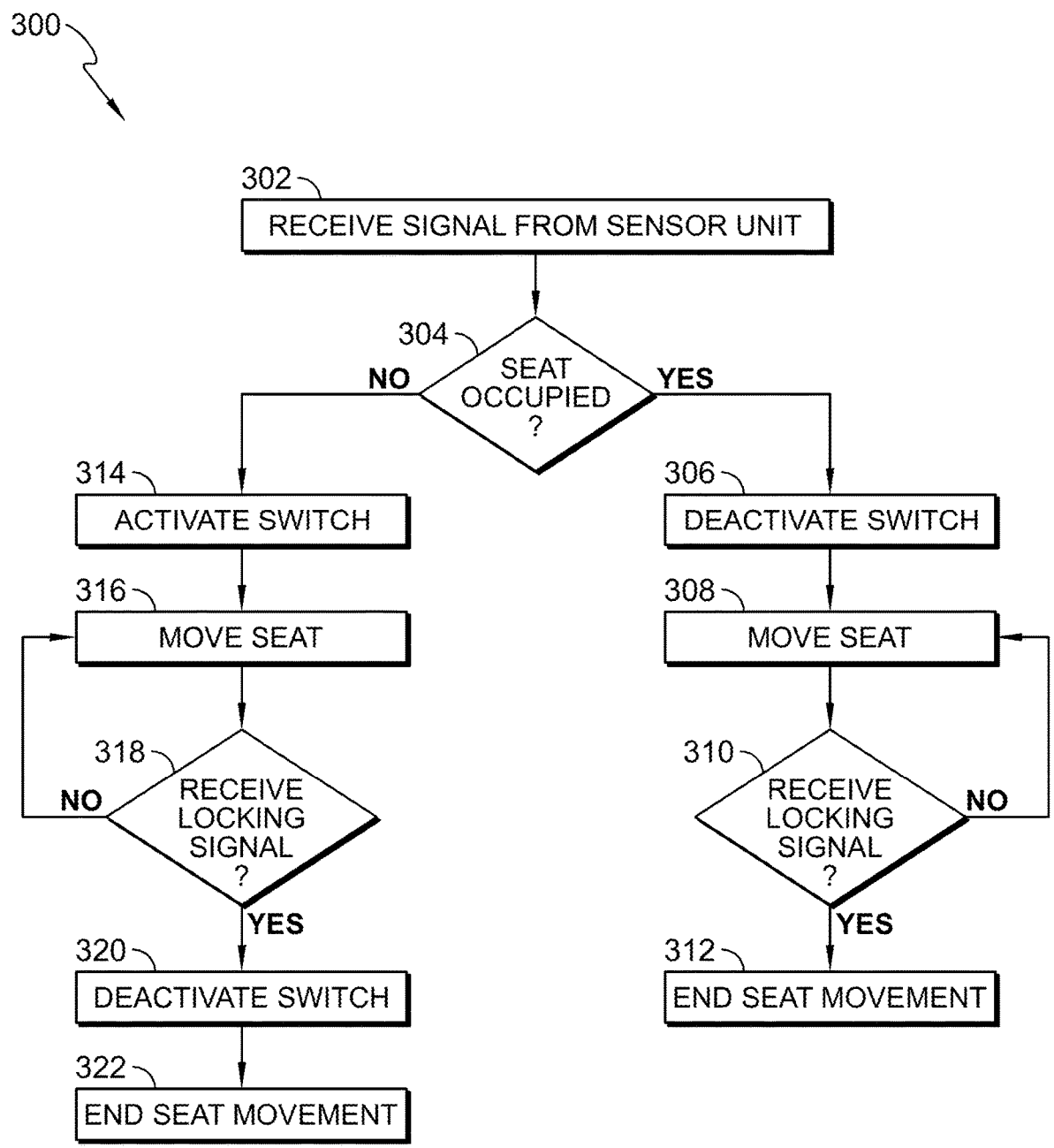
Figure 4:
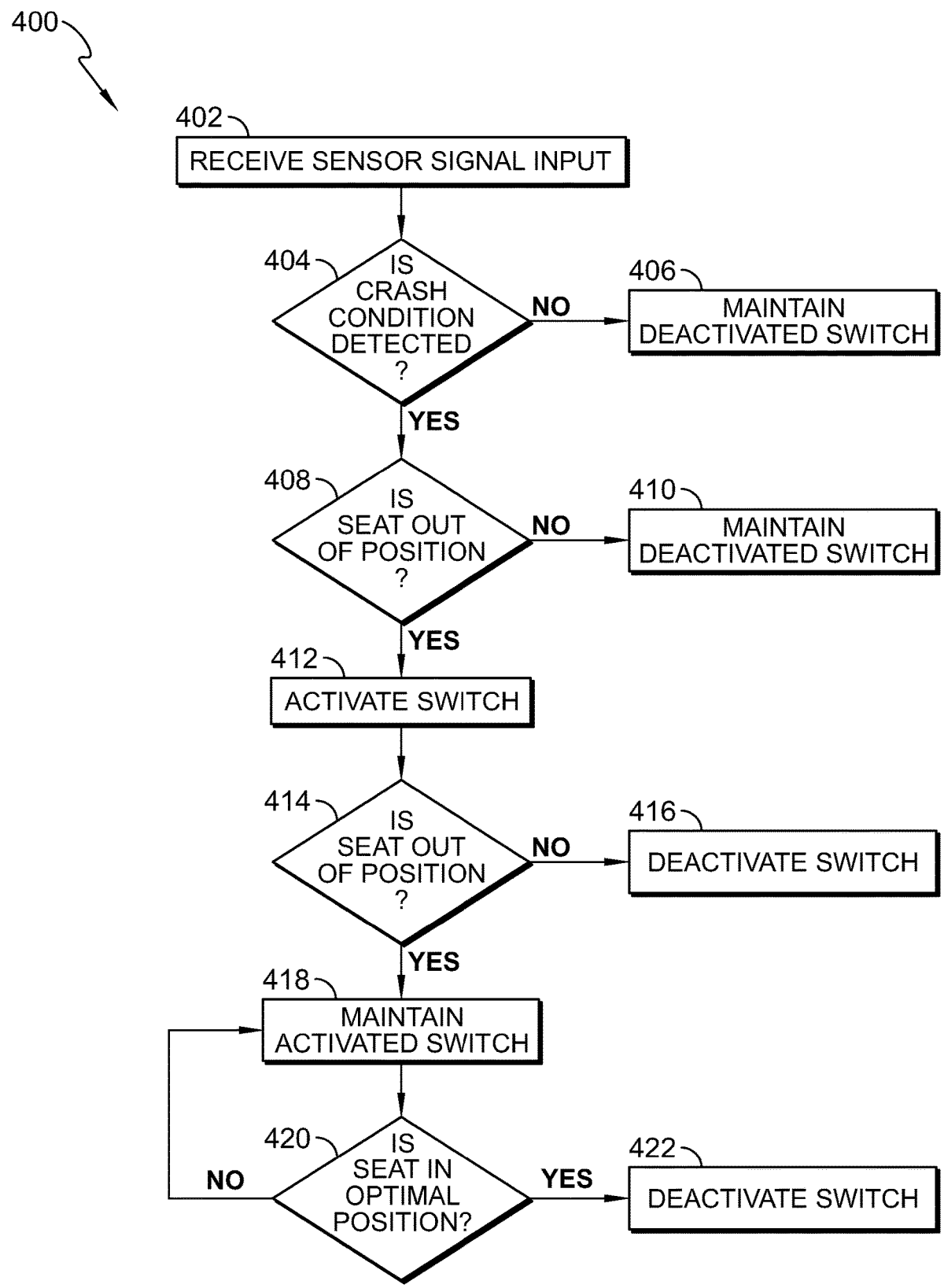

The detailed description particularly refers to the accompanying figures in which:

FIG. 1 is a side perspective view of a passenger vehicle showing a driver seated in a vehicle seat mounted to a floor for powered movement along the floor and diagrammatically showing that the vehicle seat includes an actuation system adapted to provide means for adjusting the friction that must be overcome in the seat gears to rearrange the vehicle seat within the passenger vehicle by sliding a seat bottom of the vehicle seat along the floor and/or pivoting a seat back of the vehicle seat relative to the seat bottom when inputs are provided to a controller to move the vehicle seat;

FIG. 2 is a diagrammatic view of an actuation system according to another embodiment in which the switch and each seat motion system is coupled to the vehicle frame so that the vehicle frame carries the output of the switch to each seat motion system;

FIG. 3 is a block diagram of a process performed by a controller of the efficiency switch to operate the switch between activated and deactivated switching states in order to control the efficiency with which the seat may be moved; and FIG. 4 is a block diagram of an optional process performed by a controller of the efficiency switch to operate the switch between activated and deactivated switching states during vehicle crash conditions.

DETAILED DESCRIPTION

A system for controlling the movement of a vehicle seat 11 is provided as shown in FIG. 1. The vehicle seat 11 includes a seat bottom 12 that is longitudinally slidable along a vehicle floor 118 and a seat back 14 that is rotatable about the seat bottom 12. Actuation system 16 may be in communication with the vehicle seat 11 to control movement of the seat back 14 and seat bottom 12. Actuation system 16 may include a controller 136, a switch 126, and a gear system 132. Controller 136 may be coupled to one or more sensors 134 that provide inputs to the controller for controlling movement of the vehicle seat 11. Sensors 134 may include one or more pressure sensors to detect user inputs, such as force, on the vehicle seat, weight sensors to detect seat occupancy, speed sensor or speedometer 120 inputs as well as user inputs or commands at a user interface center console 122. Controller 136 may output commands to the gear system 132 via a power source 138 coupled to the gear system 132 to drive movement of one or both of the seat bottom 12 and seat back 14. Gear system 132 may include a seat bottom gearing mechanism and a seat back gearing mechanism as described in greater detail with respect to FIG. 2.

Controller 136 may also output commands to an efficiency switch 126 to control whether the switch is active or inactive. The switch 126 when active is configured to control the efficiency rate at which the gear system 132 may operate by lowering the amount of friction between the gears in the gear system 132. Switch 126 may be an electromechanical or purely electrical and may be coupled to a power source 124 that provides the power to operate the switch 126.

Switch may include a driver 128 and a resonator 130 coupled to the gear system 132. The driver may be a piezo-driver or other driver that can generate structure born sound vibration. Optionally, the switch may include or be coupled to a resonator 130 configured to receive the vibrations from the driver 128 and transform them into a noise of appropriate microscopic oscillation frequency and amplitude to reduce and minimize the friction between gears in the gear system 132. Although this actuation system has been depicted and explained with reference to the driver's seat in FIG. 1, this system may also be incorporated into other seats in the vehicle, such as the passenger seat 10 or rear seats in the vehicle.

FIG. 2 illustrates another actuation system 200 in which an element such as the vehicle frame 240 acts as a carrier for the vibrational acoustic energy generated by the switch 242. In this manner, multiple seats and seat motion systems in the vehicle may all be coupled to the vehicle frame to be affected by a single switch 242. In this embodiment, the switch 242 and each of a seat bottom motion system 244 and seat back motion system 252 are coupled to the vehicle frame 240. Switch 242 may include a piezo-driver 228 and a resonator 230. A power source 224, sensors 234, and a controller 226 may be coupled to the switch 242 as described above with respect to FIG. 1. Sensors 234 may provide inputs to the controller 226 for switching the switch 242 between active and inactive states. Alternatively, controller 226 may be integrated in the switch 242.

Seat bottom motion system 244 may include slide mover gears 246, a controller 248, and a power source 250 for controlling the movement of a vehicle seat bottom along a vehicle floor. Seat back motion system 252 may include rotational mover gears 254, a controller 256, and a power source 258 for rotational movement of the seat back relative to the seat bottom. Slide mover gears 246 may be, for example, worm gears and rotation mover gears 254, may be, for example, rack and pinion gears. In this embodiment, the switch 242 may, in the active state, activate the piezo-driver 228 to generate sound vibration, which may be tuned to a predetermined frequency and amplitude by the resonator to be carried by the vehicle frame 240 as a micro-oscillation to the gears of the seat back and seat bottom motion systems 244, 252. The switch and the gear systems may be insulated to prevent structure-born noise of the vehicle from affecting the system.

A method 300 for activating a switch may include receiving a signal from a sensor unit 302 and determining if a seat coupled to the switch is occupied 304. If the seat is occupied, the switch is deactivated 306 or maintained in a deactivated state. The seat is moved according to one or more inputs 308, such as the received signal 302, until a locking signal is received 310, indicative of the seat being in the required position. Then seat movement is ended 312. In this manner, the switch is deactivated, requiring more input energy to drive the gear chain mechanism of the seat movement and avoiding overshooting fine custom-comfort type adjustments that are frequently performed after the user has been seated in the seat. If the seat is not occupied, then the switch is activated 314 and then the seat is moved 316 according to one or more inputs, such as the received signal 302, until a locking signal is received 318, indicative of the seat being in the required position. In response to receiving the locking signal, 318 the switch is deactivated 320 and the seat movement is ended 322. In this manner, the switch is activated, requiring less input energy to drive the gear chain mechanism of the seat movement and allowing for faster movement of the seat to an input position.

A method for controlling a switch and seat movement efficiency during vehicle crash conditions 400 is provided in FIG. 4. The method may include receiving one or more sensor signal inputs 402 and determining if a crash condition is detected 404. Sensor signal inputs may include acceleration, camera, or other inputs that indicate impacts. If there is no crash condition detected, system maintains deactivation of the switch 406. If a crash condition is detected 404 and a vehicle seat is determined to be out of position 408, then the switch may be activated 412, thereby generating and transmitting acoustic vibrations to a seat motion gear system. If the seat is within tolerances of an optimal position, system maintains deactivation of the switch 410. A vehicle seat may be determined to be out of position 408 based on predetermined optimal positions of the seat back and seat bottom in a crash condition that reduce the risk of injury to a person. For example, if the driver is too close to the steering wheel and airbag, the seat bottom may be moved along the vehicle floor toward the rear of the vehicle. The control may continuously monitor the position of the seat while the switch is activated 412 and if the seat reaches the optimal position, the switch is deactivated 416. If the seat has not reached the optimal position 414, the switch is maintained as activated 418 until the seat is in the optimal position 420 and the switch is deactivated 422. In this method, high-speed adjustments may be made to the vehicle seat position prior to a vehicle crash due to the activation of the switch, decreasing the friction to be overcome at the gear interfaces of the seat back and seat bottom movement mechanisms.

The above systems and methods allow gear systems in an actuation chain for seat movement to be operated at high-efficiency to minimize mechanical and/or electrical power needed to actuate an adjustment mechanism. Gear systems, as part of an actuation chain for seat movement, do not exceed certain efficiency to limit reversibility (self-adjustment) in normal-use cases, and in crash situations to prevent user injuries caused by self-adjustment.

The above systems and methods provide a switch that allows changing the efficiency between a low efficiency when it is desired that a position be maintained or only slightly adjusted, and high efficiency when the vehicle seat needs to be moved or adjusted. Examples of high efficiency scenarios include seat adjustment before a passenger enters a vehicle, such as folding down seats, adjusting for a new passenger, and also includes pre-crash adjustments. For the purposes of this disclosure, low efficiency is the efficiency of the gears, or friction between the gears, in their normal operating state. High efficiency is a state of reduced friction between the gears in which the efficiency is relatively higher than the normal operating state. By reducing the friction at the actuating gears, the electrical power or input force required to move the seat may be reduced or the speed of the adjustment may be increased.

It should be understood that some or all of the methodology explained above may be performed on, utilizing or with access to one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "controller" may refer to a processor or any device or portion of a device that processes electronic data from registers and/or memory to transform that electronic data into other electronic data that may be stored in registers and/or memory.

The following numbered clauses include embodiments that are contemplated and non-limiting:

Clause 1. An actuation system for a vehicle seat, the actuation system comprising
a housing.

Clause 2. The actuation system of clause 1, any other clause, or any combination of clauses, further comprising a gear system located in the housing comprising one or more gears coupled together such that a low actuation efficiency is provided such that the gears move in response to a first input.

Clause 3. The actuation system of clause 2, any other clause, or any combination of clauses, further comprising an efficiency switch coupled to the housing and configured to be switched from an inactive state in which the gear system has the low actuation efficiency to an active state in which the gear system has a relatively higher actuation efficiency.

Clause 4. The actuation system of clause 3, any other clause, or any combination of clauses, wherein the gears move in response to a second input when the gear system has the higher actuation efficiency.

Clause 5. The actuation system of clause 4, any other clause, or any combination of clauses, wherein the efficiency switch includes a driver configured to apply sound vibrations to the gears to cause friction between the gears to be minimized when the efficiency switch is in the active state.

Clause 6. The actuation system of claim 5, any other clause, or any combination of clauses, further comprising a second housing and a second gear system located in the second housing and the efficiency switch is coupled to both the gear system and the second gear system to cause both gear systems to have the relatively higher actuation efficiency when the efficiency switch is in the active state.

Clause 7. The actuation system of claim 6, any other clause, or any combination of clauses, wherein gear systems are configured to rearrange the position of the seat bottom and the seat back.

Clause 8. The actuation system of claim 5, any other clause, or any combination of clauses, further comprising vibration insulation configured to isolate the gear systems and efficiency switch from noise vibrations generated by the vehicle.

Clause 9. The actuation system of claim 5, any other clause, or any combination of clauses, wherein the driver is a piezo-driver.

Clause 10. The actuation system of claim 9, any other clause, or any combination of clauses, wherein the efficiency switch further includes a resonator arranged to extend between and interconnect the gears and the piezo-driver to transmit the sound vibrations from the driver to the gears.

Clause 11. The actuation system of claim 10, any other clause, or any combination of clauses, wherein the transmitted sound vibrations are configured to elicit microscopic oscillation of elements of the one or more gears.

Clause 12. The actuation system of claim 5, any other clause, or any combination of clauses, wherein when the efficiency switch is in the active state, friction between the gears is lower compared to when the high efficiency switch is in the inactive state.

Clause 13. The actuation system of claim 5, any other clause, or any combination of clauses, further comprising a powered driver configured to power the gears to change the seat position.

Clause 14. The actuation system of claim 13, any other clause, or any combination of clauses, wherein the gears change the seat position relatively faster and with reduced power from the powered driver relative to a speed and power required to change the seat position when the efficiency switch is in the inactive state when the efficiency switch is in the active state.

Clause 15. The actuation system of claim 5, any other clause, or any combination of clauses, wherein the first input is a force and the second input is relatively smaller force.

The invention claimed is:

1. An actuation system for a vehicle seat, the actuation system comprising
   a housing,
   a gear system located in the housing comprising one or more gears coupled together, and
   an efficiency switch coupled to the housing and configured to be switched from an inactive state in which the one or more gears move in response to a first input with a first actuation efficiency to an active state in which the one or more gears move in response to a second input with a second actuation efficiency that is greater than the first actuation efficiency, and
   wherein the efficiency switch includes a driver configured to apply sound vibrations to the one or more gears to cause friction between the one or more gears to be minimized when the efficiency switch is in the active state, and
   wherein the first input is provided in response to a first force on the vehicle seat when an occupant is present on the vehicle seat and the second input is provided in response to a second force on the vehicle seat when the vehicle seat has no occupant thereon, the second force being smaller than the first force.

2. The actuation system of claim 1, further comprising a second housing and a second gear system located in the second housing and the efficiency switch is coupled to both the gear system and the second gear system to cause both the gear system and the second gear system to have the second actuation efficiency when the efficiency switch is in the active state.

3. The actuation system of claim 2, wherein the gear system and the second gear system are configured to rearrange a position of a seat bottom and a seat back of the vehicle seat.

4. The actuation system of claim 1, further comprising vibration insulation configured to isolate the gear system and efficiency switch from noise vibrations generated by the vehicle.

5. The actuation system of claim 1, wherein the driver is a piezo-driver.

6. The actuation system of claim 5, wherein the efficiency switch further includes a resonator arranged to extend between and interconnect the one or more gears and the piezo-driver to transmit the sound vibrations from the driver to the one or more gears.

7. The actuation system of claim 6, wherein the transmitted sound vibrations are configured to elicit microscopic oscillation of elements of the one or more gears.

8. The actuation system of claim 1, wherein a first friction is present between the one or more gears when the efficiency switch is in the active state and a second friction, greater than the first friction, is present between the one or more gears when the efficiency switch is in the inactive state.

9. The actuation system of claim 1, further comprising a powered driver configured to power the one or more gears to change the seat position.

10. The actuation system of claim 9, wherein the one or more gears change the seat position at a first speed and a first power from the powered driver when the efficiency switch is in the active state and the one or more gears change the seat position at a second speed and a second power from the powered driver when the efficiency switch is in the inactive state, the second speed being less than the first speed and the second power being greater than the first power.

11. An actuation system for a vehicle seat, the actuation system comprising
   a housing,
   a gear system located in the housing comprising one or more gears coupled together and configured to move the vehicle seat, and
   an efficiency switch coupled to the housing and configured to be switched from an inactive state in response to a first input to an active state in response to a second input,
   wherein the first input causes the gear system to provide a first force on the vehicle seat in the inactive state and the second input causes the gear system to provide a second force on the vehicle seat in the active state, the second force being smaller than the first force,
   wherein the efficiency switch includes a driver configured to apply sound vibrations to the one or more gears to cause friction between the one or more gears to be minimized when the efficiency switch is in the active state, and
   wherein the actuation system further includes a sensor and the sensor is configured to: (1) provide the first input when an occupant is on the vehicle seat and (2) provide the second input when the vehicle seat has no occupant thereon.

12. The actuation system of claim 11, wherein, in the inactive state, the one or more gears move in response to the first input with a first actuation efficiency, and, in the active state, the one or more gears move in response to the second input with a second actuation efficiency that is greater than the first actuation efficiency.

13. The actuation system of claim 12, further comprising a second housing and a second gear system located in the second housing and the efficiency switch is coupled to both the gear system and the second gear system to cause the gear system and the second gear system to have the second actuation efficiency when the efficiency switch is in the active state.

14. The actuation system of claim 13, wherein the gear system and the second gear system are configured to rearrange the position of a seat bottom and a seat back of the vehicle seat.

15. The actuation system of claim 11, further comprising vibration insulation configured to isolate the gear system and efficiency switch from noise vibrations generated by the vehicle.

16. The actuation system of claim 11, wherein the driver is a piezo-driver.

17. The actuation system of claim 16, wherein the efficiency switch further includes a resonator arranged to extend between and interconnect the one or more gears and the piezo-driver to transmit the sound vibrations from the driver to the one or more gears.

18. The actuation system of claim 11, wherein a first friction is present between the one or more gears when the efficiency switch is in the active state and a second friction, greater than the first friction, is present between the one or more gears when the efficiency switch is in the inactive state.

19. The actuation system of claim 18, wherein the one or more gears change seat position at a first speed and a first power from the powered driver when the efficiency switch is in the active state and the one or more gears change seat position at a second speed and a second power from the powered driver when the efficiency switch is in the inactive state, the second speed being less than the first speed and the second power being greater than the first power.

* * * * *